United States Patent
Yoshizawa et al.

[11] Patent Number: 6,163,271
[45] Date of Patent: *Dec. 19, 2000

[54] KEY-LESS ENTRY SYSTEM

[75] Inventors: Takashi Yoshizawa; Akira Shimada, both of Kanagawa-ken, Japan

[73] Assignee: Nissan Motor Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/056,615

[22] Filed: Apr. 8, 1998

[30] Foreign Application Priority Data

Apr. 8, 1997 [JP] Japan .................................. 9-089672

[51] Int. Cl.<sup>7</sup> ...................................................... G06F 7/04
[52] U.S. Cl. ................................ 340/825.31; 340/825.34
[58] Field of Search ........................ 340/825.31, 825.34, 340/825.72, 825.69, 825.32; 307/10.1, 10.2, 10.3, 10.7, 10.9, 141; 364/150

[56] References Cited

U.S. PATENT DOCUMENTS

| | | | |
|---|---|---|---|
| 4,035,661 | 7/1977 | Carlson | 307/141 |
| 4,887,064 | 12/1989 | Drori et al. | 340/825.31 |
| 5,146,215 | 9/1992 | Drori | 340/825.31 |
| 5,473,318 | 12/1995 | Martel | 340/825.31 |
| 5,495,722 | 3/1996 | Manson et al. | 236/51 |

OTHER PUBLICATIONS

Nissan Product Bulletin: Nissan 240 SX Model S14 Series; 1995 Model Introduction; Feb. 1994, Publication No. PB5E–0S14U0.

*Primary Examiner*—Howard L. Williams
*Assistant Examiner*—Jean Bruner Jeanglaude
*Attorney, Agent, or Firm*—McDermott, Will & Emery

[57] ABSTRACT

An ID setup/change unit (61) adapted for ID registration, change and deletion to and from a memory (46) is connectable to a vehicle-mounted controller (3), permitting a facilitated ID storage for the registration, as well as facilitated change and deletion of a registered ID, with an enhanced operation efficiency.

20 Claims, 13 Drawing Sheets

FIG. 11

KEY-LESS ENTRY SYSTEM

BACKGROUND OF THE INVENTION

1. Field of the Invention

The present invention relates to a key-less entry system for remote-control operations, such as vehicle door lock/unlock operations to be performed by ID (identification number) collation without employing an ignition key, and particularly, it relates to a key-less entry system improved of ID registration.

2. Description of Relevant Art

There are key-less entry systems put to practical use. They are of a type in which an ID is collated to effect remote-control of a door to be locked or unlocked, as well as of a trunk lid to be opened, without inserting a key into a key cylinder and operating the inserted key to be rotated.

Such systems have a key-less remote controller (hereinbelow "remote controller") provided with a door lock switch, a door unlock switch and a trunk opener switch. When any switch is operated, its operation data are transmitted from the remote controller together with an own ID of the remote controller. The transmitted data and ID are received by a key-less entry controller at a vehicle end (hereinbelow "vehicle-mounted controller"), where the transmitted ID is collated with a registered ID and, if they match, the transmitted data are processed to execute a process corresponding to the operated switch, i.e., a door locking or unlocking process or a trunk opening process.

The vehicle-mounted controller is adapted for registration of a predetermined number of ID's, by the provision of switches connected thereto, which switches are operable in an instructed manner to enter an ID registration mode. In conventional key-less entry systems, the registration of a new ID is permitted (1) after deletion of all ID's that have been registered or (2) after deletion of one of registered ID's that is earliest of registration.

The case (1) needs all the registered ID's to be once deleted before a renewed registration of ID's to be registered, with registration of the new ID inclusive, and is unfavorable in efficiency of operation.

The case (2) also has unfavorable operation efficiency in the event of a missing remote controller needing all registered ID's to be once deleted by repeating registration of a respective one of new ID's as many times as their number.

SUMMARY OF THE INVENTION

The present invention has been achieved with such points in view.

It therefore is an object of the present invention to provide a key-less entry system facilitated in new registration, change and deletion of ID's.

To achieve the object, a first aspect of the invention provides a key-less entry system comprising a remote controller for transmitting an ID when an operation element is operated, and a vehicle-mounted controller for receiving the ID transmitted from the remote controller, collating the ID with an ID stored as a registered ID in a memory, and responding to a match therebetween for execution of a corresponding process to the operation element, wherein at ID setup and change unit for performing a storage of an ID to be registered and a change and a deletion of a registered ID relative to the memory is connectable to the vehicle-mounted controller.

According to a second aspect of the invention, the ID setup and change unit comprises a trouble diagnostic device for executing trouble diagnoses of diverse vehicle-mounted control systems.

According to a third aspect of the invention, the ID setup and change unit displays an address in the memory where an ID of the remote controller is stored.

According to a fourth aspect of the invention, the ID setup and change unit is adaptive for storing an ID of the remote controller at an arbitrary address in the memory.

According to a fourth aspect of the invention, the ID setup and change unit is adaptive for deleting an ID stored at an arbitrary address in the memory.

Further, to achieve the object described, a sixth aspect of the invention provides a key-less entry system for vehicles, comprising a first controller fixed to a vehicle, the first controller being operative for collating an input ID thereto with one or more registered ID's stored therein and responsive to a match therebetween to allow key-less entry into the vehicle, a second controller operative at a remote distance from the vehicle to transmit a preset ID to be received by the first controller, as the input ID thereto, and a third controller connectable to the first controller and operative in a selective one of a first mode for processing the input ID to store the input ID as a registered ID in the first controller and a second mode for processing to delete at least one of the one or more registered ID's.

According to a seventh aspect of the invention, the first controller has a plurality of memory locations including one or more memory locations for storing therein the one or more registered ID's in a one-to-one corresponding manner, and the third controller is operative in the first mode for changing one of the one or more registered ID's stored in one of the one or more memory locations, to the registered ID.

According to an eighth aspect of the invention, the third controller is operative for indicating an address of a respective one of the one or more memory locations.

According to a ninth aspect of the invention, the third controller prevents the input ID from being processed to be stored as the registered ID in one of the one or more memory locations.

According to a tenth aspect of the invention, the third controller is operative in the second mode to enter a selective one of a third mode for deleting a selective one of the one or more registered ID's and a fourth mode for deleting all of the one or more registered ID's by a single operation.

According to an eleventh aspect of the invention, the third controller comprises a data processor provided with a touch panel display operative for entering a coded data.

Therefore, according to the first aspect, there is permitted a facilitated ID storage, change and deletion simply by connection of an ID setup and change unit to a vehicle-mounted controller.

According to the second aspect, a trouble diagnostic device is commonly employed as an ID setup and change unit that otherwise might have been provided for a dedicated purpose.

According to the third aspect, a possible checkup of ID registration facilitates finding a troubling point, as well as a memory address check before ID deletion.

According to the fourth aspect, re-registration of an existing ID is unnecessary when registering an additional ID.

According to the fifth aspect, a missing remote controller will not require deleting other ID's than its ID.

According to the sixth aspect, an operator can select one of first and second modes in a voluntary manner.

According to the seventh aspect, possible registration of a new ID ensures an enhanced operation efficiency.

According to the eighth aspect, a prompt visible confirmation is possible to check for an unused memory location.

According to the ninth aspect, there is effected a potential prevention of a mistaken or unlawful ID change.

According to the tenth aspect, possible deletion of an individual ID allows an intentional deletion, and that of whole ID's assures a saved time.

According to the eleventh aspect, there can be achieved a compact and inexpensive controller.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIGS. 9 to 14 are flowcharts of actions of a key-less entry system according to another embodiment of the invention, respectively.

DETAILED DESCRIPTION OF THE PREFERRED EMBODIMENTS

Figure 1:
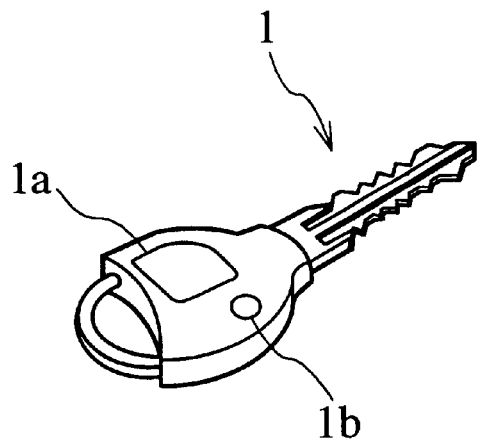
FIG. 1 is a perspective view of an ignition key including a remote controller of a key-less entry system according to an embodiment of the invention.

There will be detailed below the preferred embodiments of the present invention with reference to the accompanying drawings. Like members are designated by like reference characters.

Figure 2:
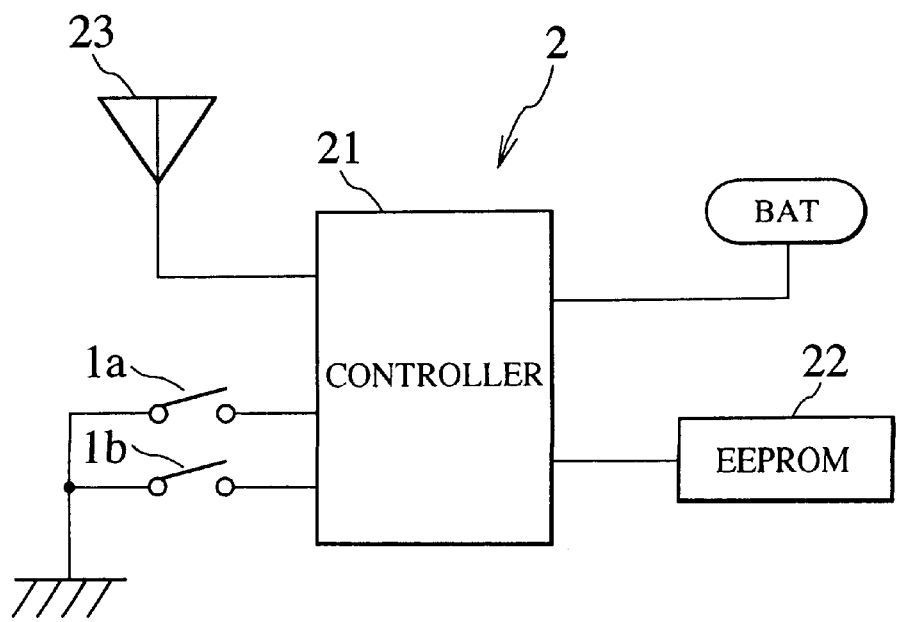
FIG. 2 is a circuit diagram of the remote controller of FIG. 1.
Figure 3:
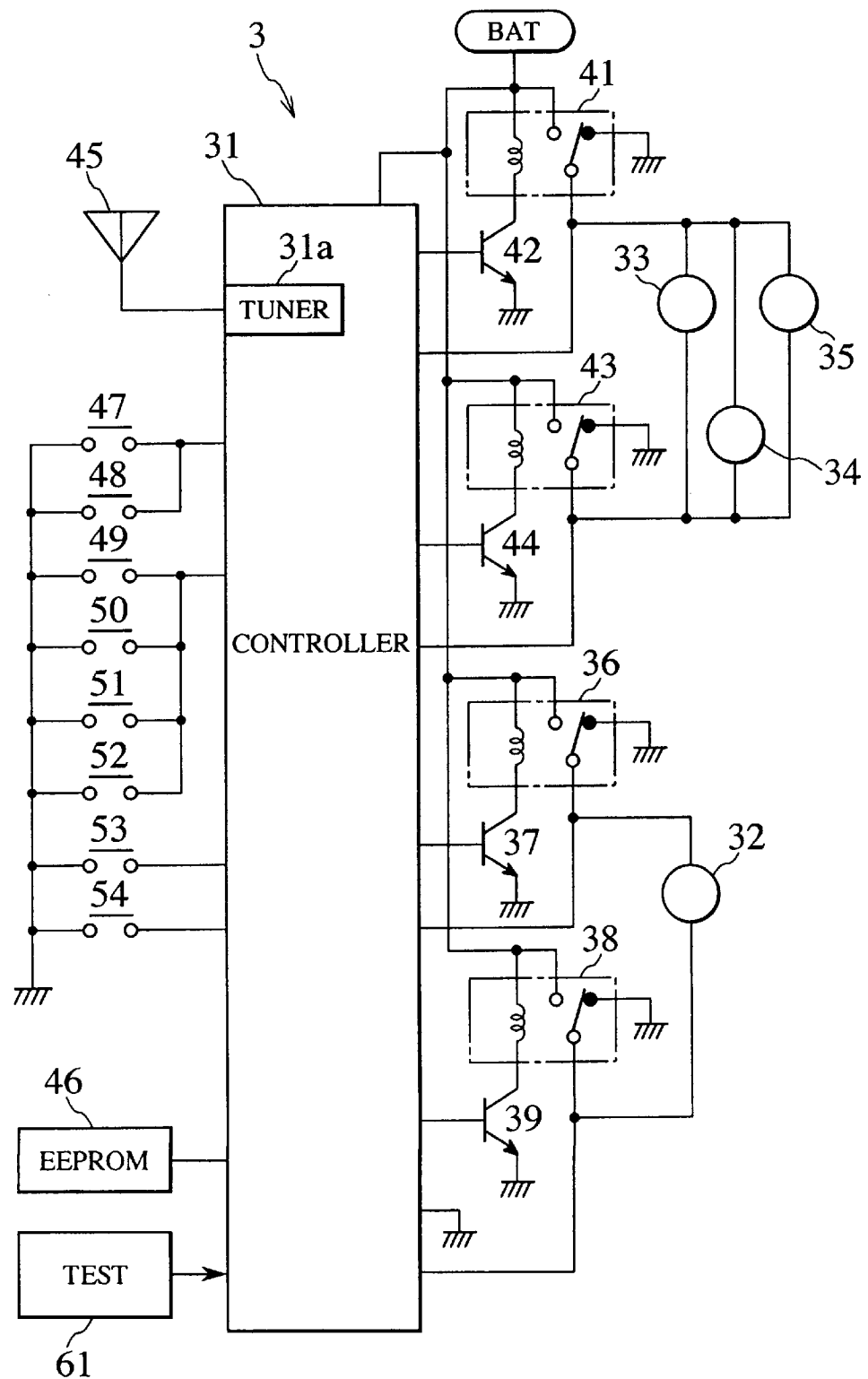
FIG. 3 is a circuit diagram of a vehicle-mounted controller of the key-less entry system.

FIG. 1 illustrates an appearance of an ignition key having an incorporated key-less remote controller (hereafter sometimes "remote controller") of a key-less entry system according to a first embodiment of the invention, as it is applied to an unshown automobile of which an engine starter and respective doors and trunk lids are operable by the ignition key, and FIGS. 2 and 3 show circuit diagrams of the remote controller and a key-less entry controller installed in the automobile (hereafter sometimes "vehicle-mounted controller") of the system, respectively.

In the figures, designated by reference numeral 1 is the ignition key, 2 is an entirety of the remote controller and 3 is that of the vehicle-mounted controller. The key-less entry system according to the present embodiment comprises the remote controller 2 (FIG. 2) incorporated in the key 1 (FIG. 1), and the vehicle-mounted controller 3 (FIG. 3). The incorporated remote controller 2 in the key 1 may be separated therefrom as an individual unit.

The remote controller 2 of FIG. 2 is buried or housed in the key 1. As illustrated in FIG. 1, the key 1 has a grip as a head, where it has a door lock switch 1a and a door unlock switch 1b exposed outside as operable elements at the remote controller end. The remote controller 2 responds to an operation of the door lock switch 1a to transmit a set of data on locking information and a preset proper ID (identification number) of the key 1, and to an operation of the door unlock switch 1b to transmit a set of data on unlocking information and the ID of the key 1.

The remote controller 2 is constituted with a controller 21 as a principal component including a microcomputer. The controller 21 is connected to or interfaced with a non-volatile memory 22, such as an EEPROM (electrically erasable programmable read only memory), with the proper ID stored therein for the individual key, the door lock switch 1a, the door unlock switch 1b, an antenna 23, and a battery BAT.

The vehicle-mounted controller 3 is constituted with a controller 31 as a principal component, as in FIG. 3. The controller 31 comprises a microcomputer with peripheral devices and a tuner 31a, and is adapted for lock/unlock control of respective doors aside a driver's seat, an assistant's seat and left and right rear passenger's seat of the automobile, which doors have their door lock actuators 32 to 35. The tuner 31a reproduces the transmitted data from the remote controller 2. The door lock actuators 32 to 35 are each respectively controllable to drive an unshown door lock mechanism of a corresponding door into one of its lock and unlock positions.

One door provided at the driver's seat is associated with the door lock actuator 32, which is controlled by a combination of a lock relay 36 and an unlock relay 38. The lock relay 36 is drivable with a transistor 37 for supplying electric power from a battery BAT to a terminal of the door lock actuator 32 to drive the door lock mechanism of the door at the driver's seat into its lock position. An output line from the lock relay 36 to the door lock actuator 32 is connected to the controller 31, for monitoring a locking output thereon. The unlock relay 38 is drivable with a transistor 39 for supplying electric power from the battery BAT to an opposite terminal of the door lock actuator 32 to drive the door lock mechanism of the door at the driver's seat into its unlock position. An output line from the unlock relay 38 to the door lock actuator 32 is also connected to the controller 31, for monitoring an unlocking output thereon.

The remaining doors provided at the assistant's seat and the left and right rear passenger's seats are associated with the door lock actuators 33–35, which are commonly controlled by a combination of a lock relay 41 and an unlock relay 43. The lock relay 41 is drivable with a transistor 42 for supplying electric power from the battery BAT to terminals of the door lock actuators 33–35 to drive the respective door lock mechanisms of the doors at the assistant's and left and right rear passenger's seats into their lock positions. A common output line from the lock relay 36 to the door lock actuators 33–35 is connected to the controller 31, for monitoring a locking output thereon. The unlock relay 43 is drivable with a transistor 44 for supplying electric power from the battery BAT to opposite terminals of the door lock actuators 33–35 to drive the door lock mechanisms of the doors at the assistant's and left and right rear passenger's seats into their unlock positions. A common output line from the unlock relay 43 to the door lock actuators 33–35 is also connected to the controller 31, for monitoring an unlocking output thereon.

The controller 31 is further connected to or interfaced with an antenna 45, and a non-volatile memory 46 such as an EEPROM. The antenna 45 is arranged in a rear wind shield of the automobile, for receiving electromagnetic waves transmitted from the remote controller 2 in a wireless manner.

A storage region of the memory 46 has four numbered memory locations addressed as address-1 to address-4 (hereafter sometimes "memory-1" to "memory-4" in terms of memory location number) and secured for storing at most four ID's of the remote controller 2. The non-volatile memory 46 may be other than EEPROM. The number of memory locations or addresses secured for ID storage may be a voluntary, other than four.

The controller 31 is further connected to various indicator switches including a driver's seat door key cylinder lock switch 47 to be close when a key cylinder of the door at the driver's seat is in its lock position, an assistant's seat door key cylinder lock switch 48 to be close when a key cylinder of the door at the assistant's seat is in its lock position, four door switches 49–52 to be each individually close when a corresponding one of the doors at the driver's seat, the assistant's seat and the left and right rear passenger's seat is detected to be open, a key switch 53 to be close when the ignition key 1 is inserted into a key cylinder therefor, and an accessory switch 54 to be close when the ignition key 1 is set to an ACC (accessory) position.

For the vehicle-mounted controller 3 is provided a trouble diagnostic device 61 of a portable type for diagnosing failures, faults, malfunctions and other troubles such as of an engine control system, an automatic transmission device and the key-less entry system. The diagnostic device 61 is adapted for connection to the controller 31 to effect a new registration, change and deletion of ID's relative to the key-less entry system. To this point, the diagnostic device 61 has a display with touch key switches operable for data entry and display. The trouble diagnostic device 61 may be a separate type composed of a stationary unit dedicated for trouble diagnoses of vehicle-mounted objects such as the engine control system and the automatic transmission device, and a portable unit dedicated for setup and change of ID's.

There will be described actions of the key-less entry system according to the present embodiment, with reference to FIGS. 4 to 8.

The trouble diagnostic device 61 is now connected to a dedicated port of the vehicle-mounted controller 3, and an unshown main switch is turned on, allowing for a trouble diagnostic process to start. First, at a step S1 of FIG. 4, the display of the diagnostic device 61 displays a screen of a trouble diagnosis menu for selection of a target system to be diagnosed. A smart entrance system is now selected, as it is a nomenclature of the key-less entry system in concern. Then, a programmed control flow of the process goes to a step S2, where it displays a screen for selection of items to be diagnosed in the entrance system. A "remote control ID setup/change" is now exemplarily selected, and the control flow goes to a subsequent step S3, where it displays a screen with a header of remote control ID setup/change selection.

The remote control ID setup/change selection screen has a "remote control ID memory check" mode. If this mode is selected, the flow goes to a step S4 shown in FIG. 5. The remote control ID memory check mode is for a check whether or not a transmitted ID from the remote controller 2 is registered, i.e., if a matching ID is stored in the memory 46. According, at a step S5, there is displayed a remote control ID check screen with a message instructing an operation of the remote controller 2. Upon this operation, an ID is transmitted from the remote controller 2 and received at the vehicle-mounted controller 3, where it is collated with one or more ID's read from the memory 46. When the received ID matches a read ID, i.e., if a matching ID is stored at one of the four addressed memory locations in the memory 46, then one of four address keys (displayed with indications of "memory-1" to "memory-4" on the screen) that corresponds to an address of the location of the matching ID is highlighted for an interval of one second. Thereafter, the flow again goes to the step S3 of FIG. 4, displaying the remote control ID setup/change selection screen.

The remote control ID setup/change selection screen further has a "remote control ID registration" mode. If this mode is selected, the flow goes to a step S6 shown in FIG. 6. The remote control ID registration mode is for processing a transmitted ID from the remote, controller 2 to register it at a selective one of the four memory addresses, i.e., to store it at a corresponding memory location in the memory 46, whereas for the memory location selection a corresponding address key is to be operated by pressing. At the step S6, if the memory 46 has a single ID stored therein, then the flow goes to a step S9. In other cases, i.e., when the memory 46 has two or more ID's or no ID stored therein, the flow goes to a step S7, where it displays a remote control ID registration screen, highlighting respective address keys of memory locations in which certain ID's are stored. In exemplary illustration of the step S7 in FIG. 6, two ID's are already stored at a memory-1 and a memory-2 in a one-to-one corresponding manner, and two corresponding address keys are highlighted. When an address key is operated at the step S7, if an ID is registered at a corresponding memory address, then the flow goes to a step S8, giving a message for confirmation as to whether or not the registered ID should be changed. When a response thereto is made by operating a "YES" key, the flow goes (via a node B) to a step S10 shown in FIG. 7 for changing the registered ID to a new ID. If a "NO" key is operated, the flow again goes to the step S7. If a memory location corresponding to the address key operated at the step S7 has no ID stored therein, the flow directly goes to the step S10 to register a new ID in the unused memory location.

In the case a single ID is registered at the step S6, the flow goes to the step S9 to display a screen for having one of the four memory addresses selected for registration of a new ID. The single ID is stored by using a certain memory location and a corresponding address key may be operated for the selection, which select operation however is ineffective and will not be accepted, i.e., the flow stays at the step S9. When an address key of an unused memory location is operated, the flow goes to the step S10.

At the step S10, there are displayed messages instructing a necessary operation to register a new ID. With this operation performed, an ID is received as the new ID from the remote controller 2 and stored in a memory location designated by an operation at the step S7 or S9. Then, a subsequent step S11 displays a message of completion of remote control ID registration, highlighting address keys of memory locations having registered ID's. An "END" key is operable to go to the step S3, where the remote control ID setup/change selection screen will be displayed. If a "next registration" key is operated, the flow again goes to the step S7, permitting another new ID to be registered in the described manner. The ID registration may be effected at the step S10 in an overwriting manner, without deletion of an existing ID, e.g., by bypassing the step S8 or steps S7 to S9.

The remote control ID setup/change selection screen has a key for a "remote control ID deletion" mode. When this key is operated, the flow goes to a step S12 shown in FIG. 8. The remote control ID deletion mode permits ID's registered at all memory addresses of the storage region of the memory 46 to be wholly deleted, as well as an ID registered at any memory address to be deleted. To this point, a step S13 displays a screen including an "all memory deletion" key and four address keys. The four address keys are each operative to select a memory address of an ID to be deleted. Any address key having a registered ID at a corresponding memory address is highlighted. An address key of an unused memory location may be operated for selection, which operation however is ineffective and will not be accepted. Upon operation to the "all memory deletion" key or to an address key of any memory address having a registered ID, the flow goes to a step S14, where in the latter case the registered ID is deleted from the address of the selected address key. In the former case, i.e., in the case the "all memory deletion" key is operated, all ID's stored at the addresses-1 to -4 are wholly deleted. In either case, the address key of each memory address having deleted ID is normally displayed, i.e., not highlighted yet. An "END" key is operable to go to the step S3, where the remote control ID setup/change selection screen will be displayed. If a "next deletion" key is operated, the flow again goes to the step S13, permitting another registered ID to be deleted from an associated memory address in the described manner.

There will be described below a key-less entry system according to a second embodiment of the invention that has an analogous constitution to the key-less entry system according to the first embodiment shown in FIGS. 1 to 3.

The description will thus be made of actions in the second embodiment, with reference to FIGS. 9 to 14.

Figure 4:
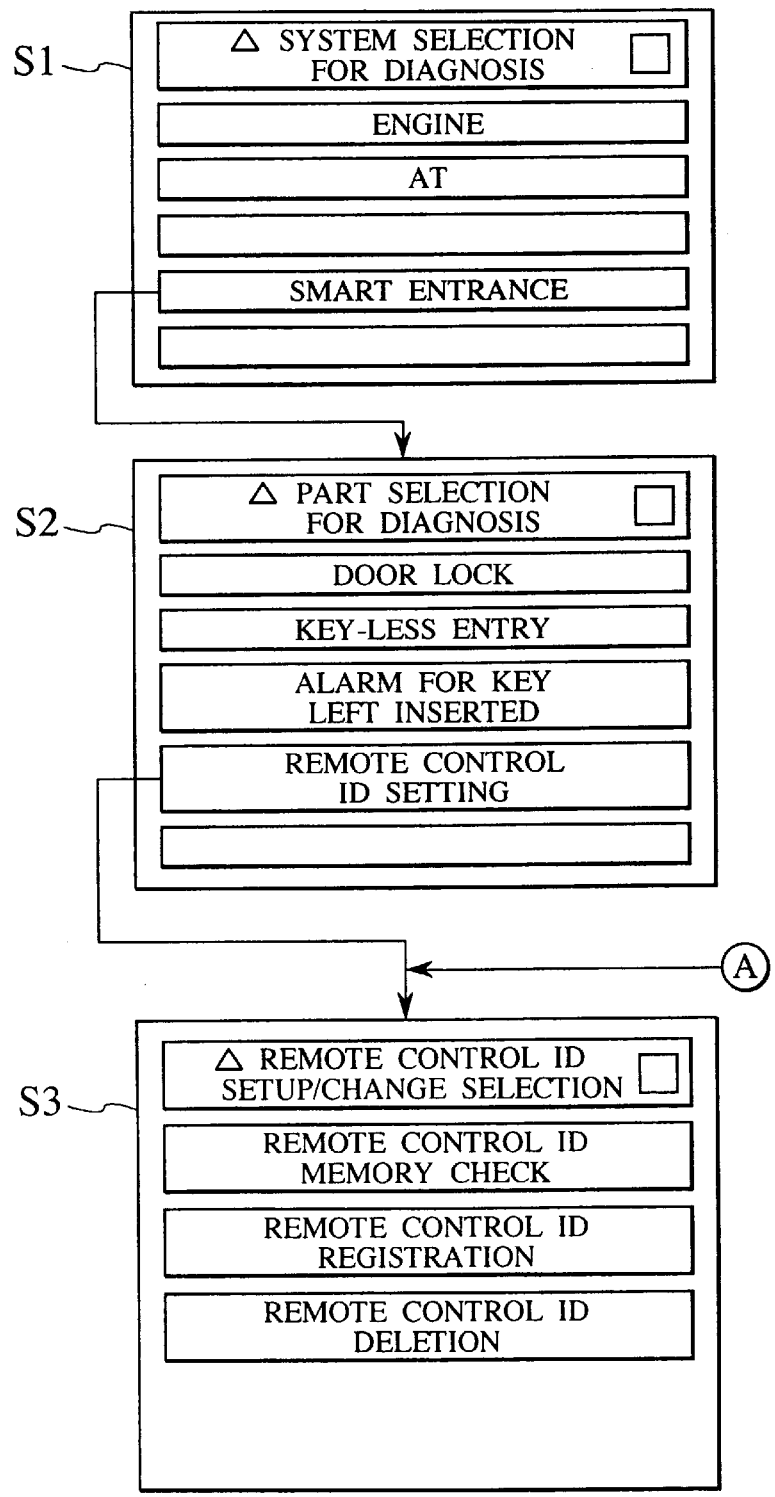
FIGS. 4 to 8 are flowcharts of actions of the key-less entry system, respectively.
Figure 5:
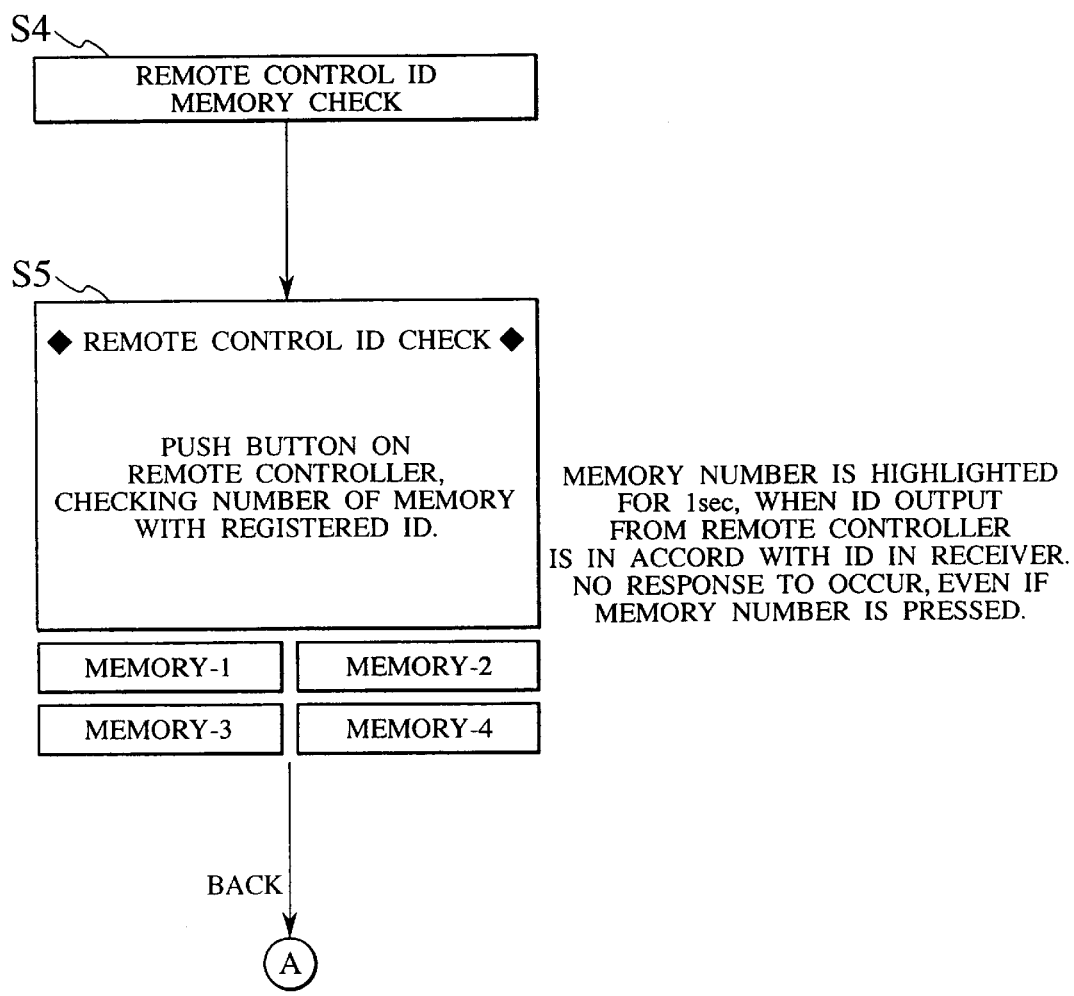
Figure 6:
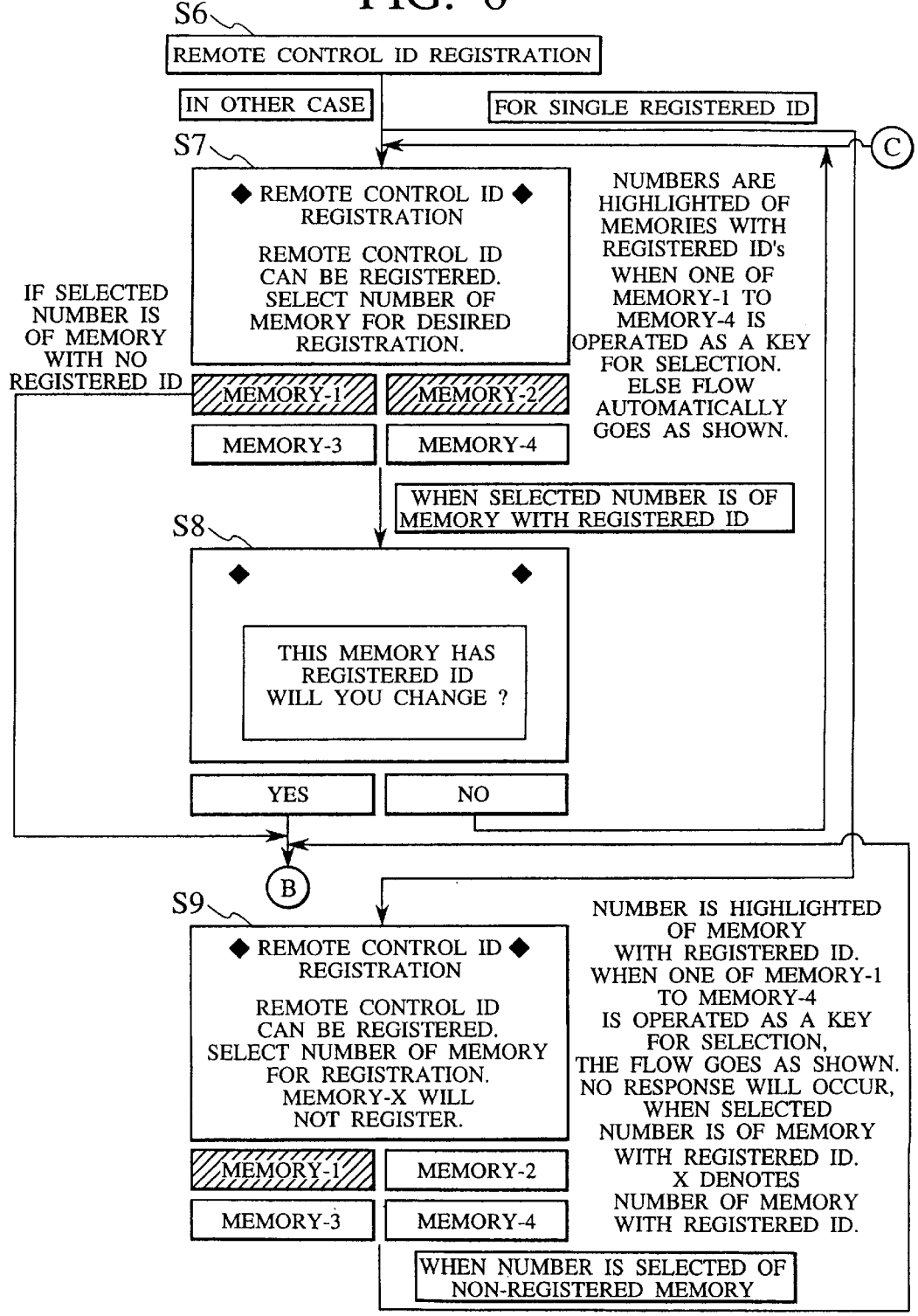
Figure 7:
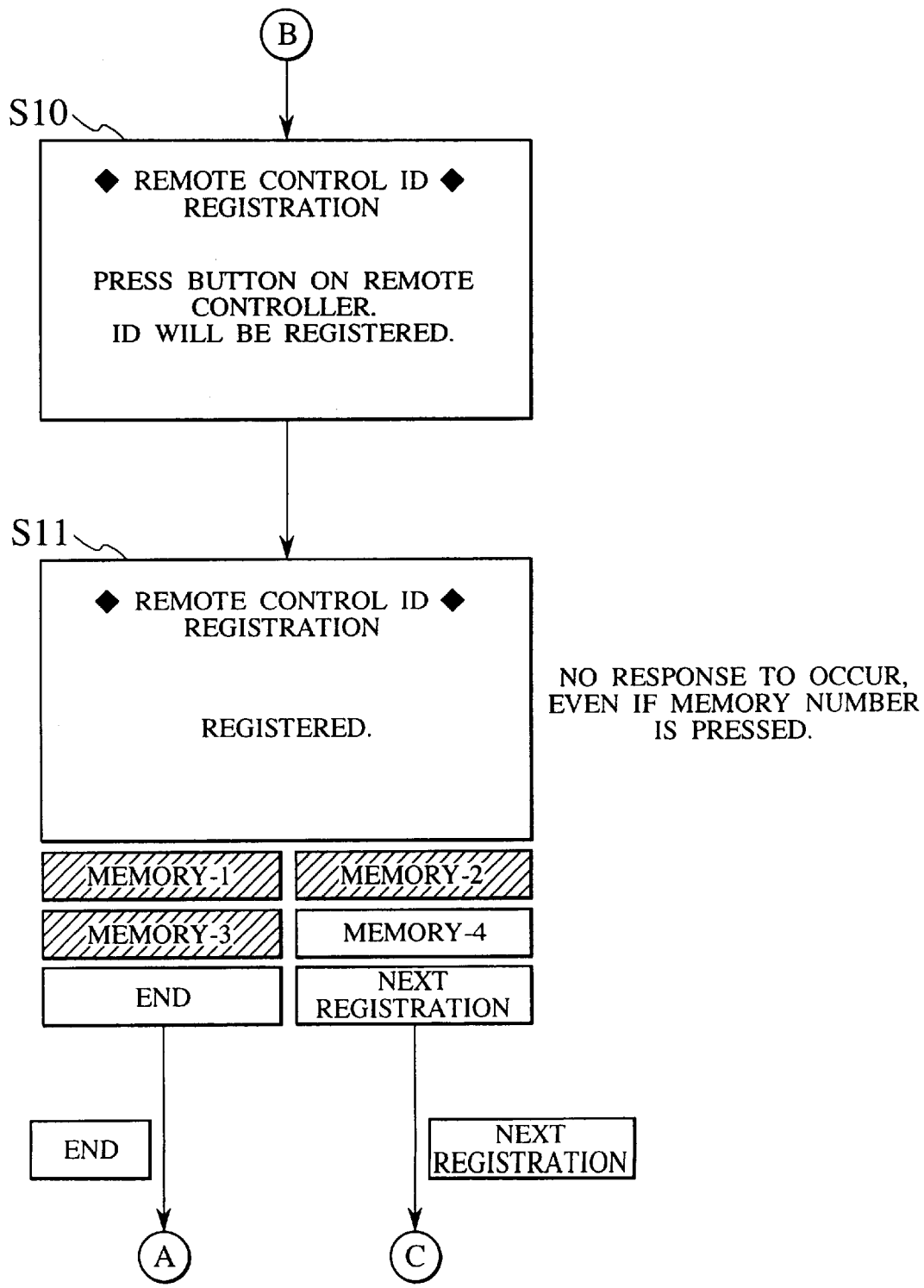
Figure 8:
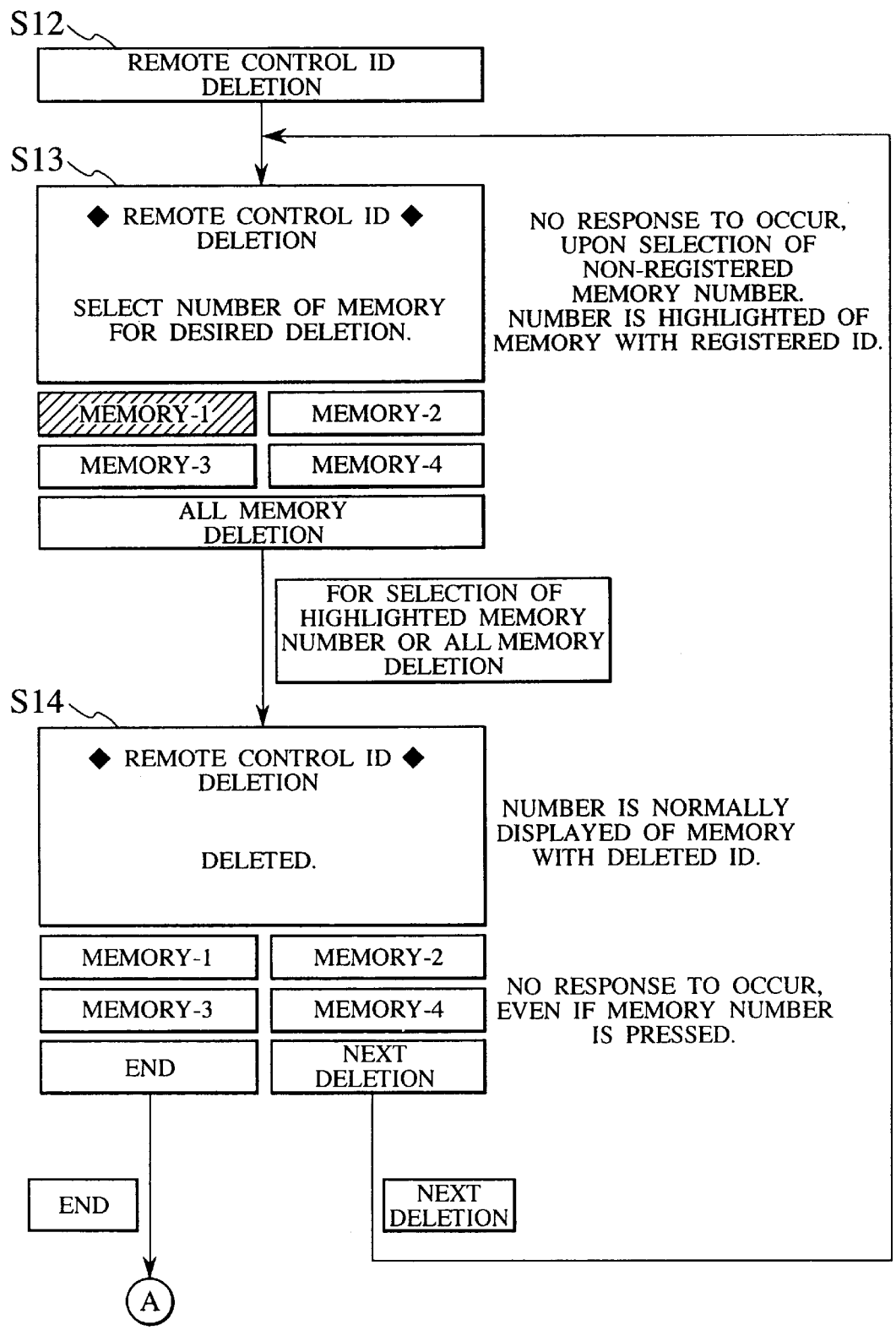
Figure 9:
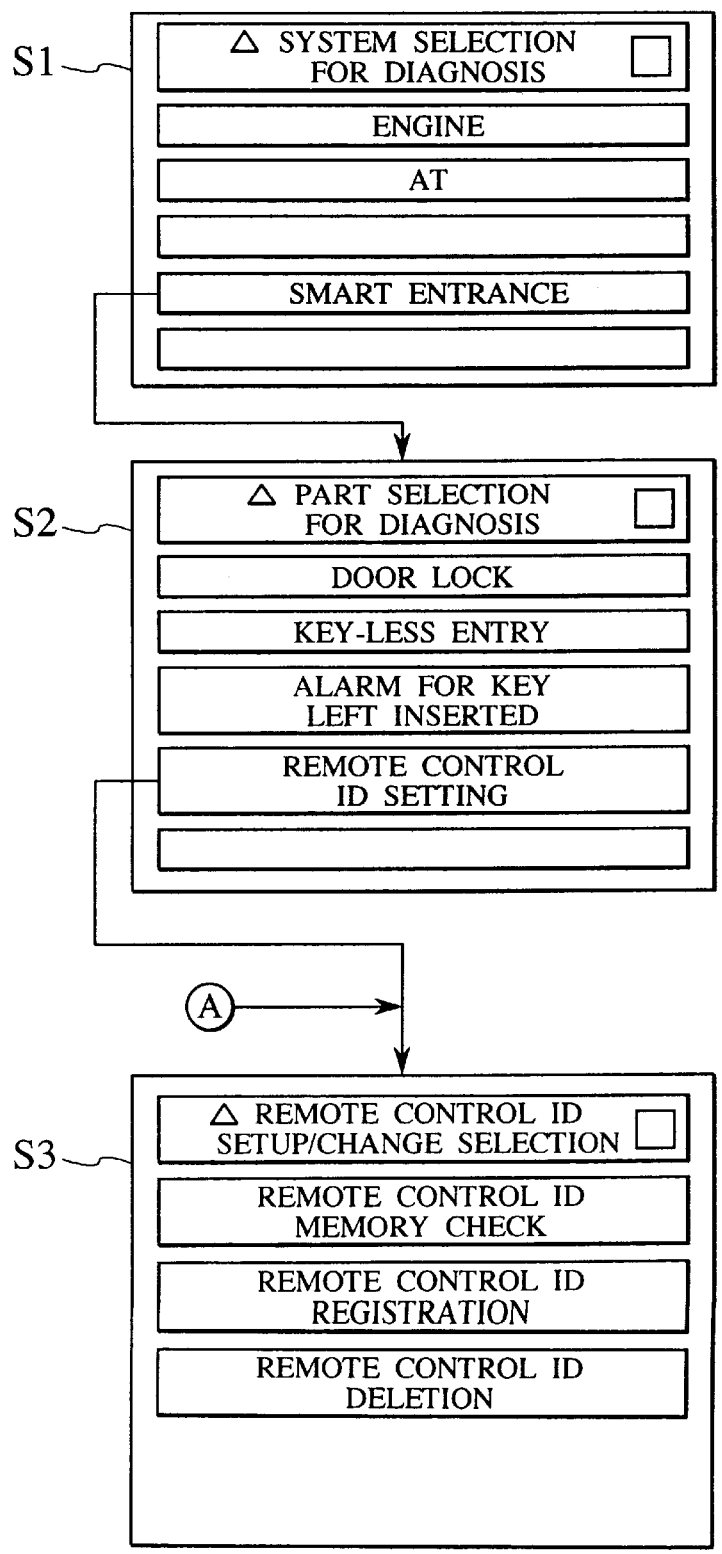

At steps S1 to S3 shown in FIG. 9, programmed actions in the second embodiment are similar to those in the first embodiment shown in FIG. 4.

Figure 10:
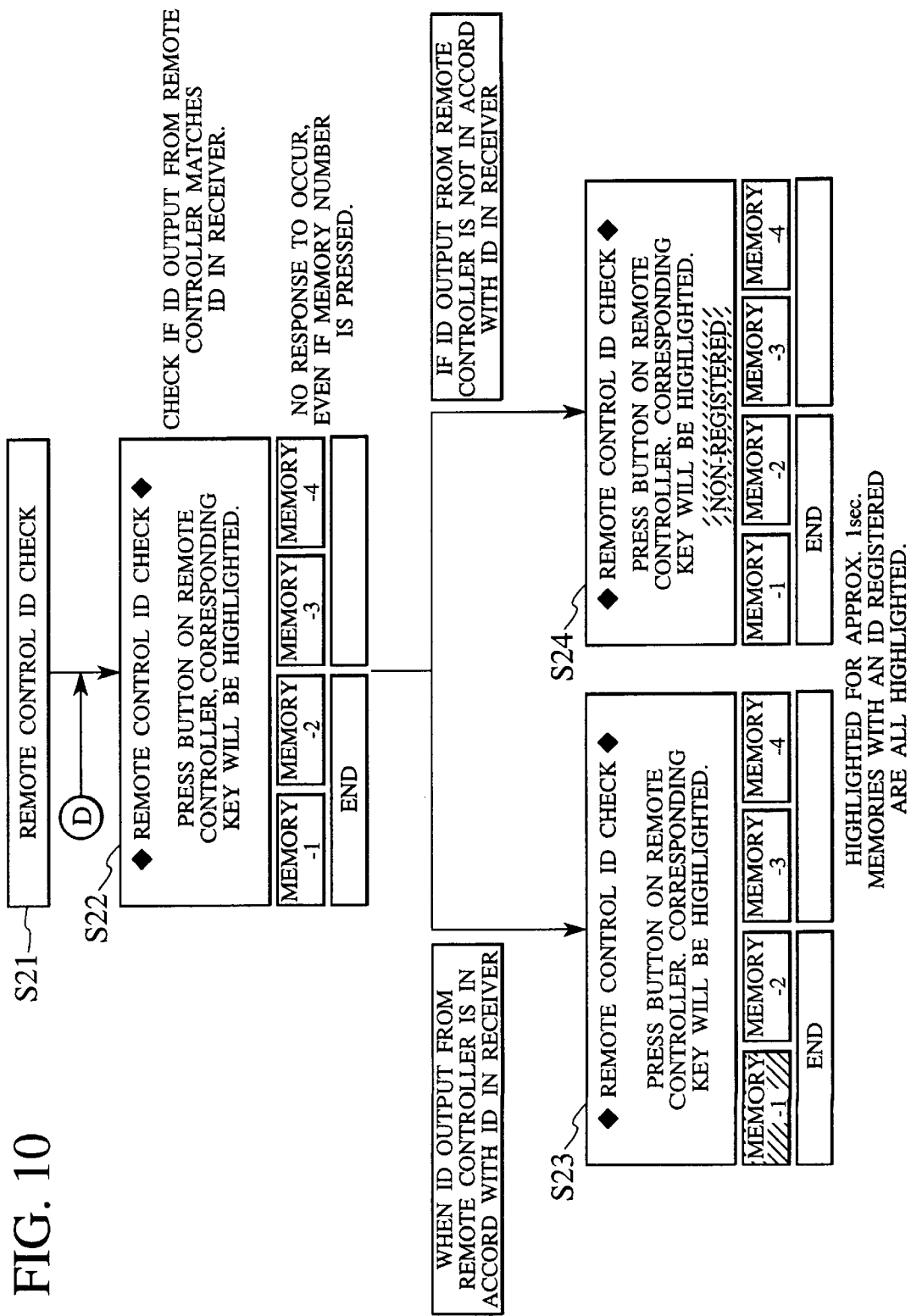
Figure 12:
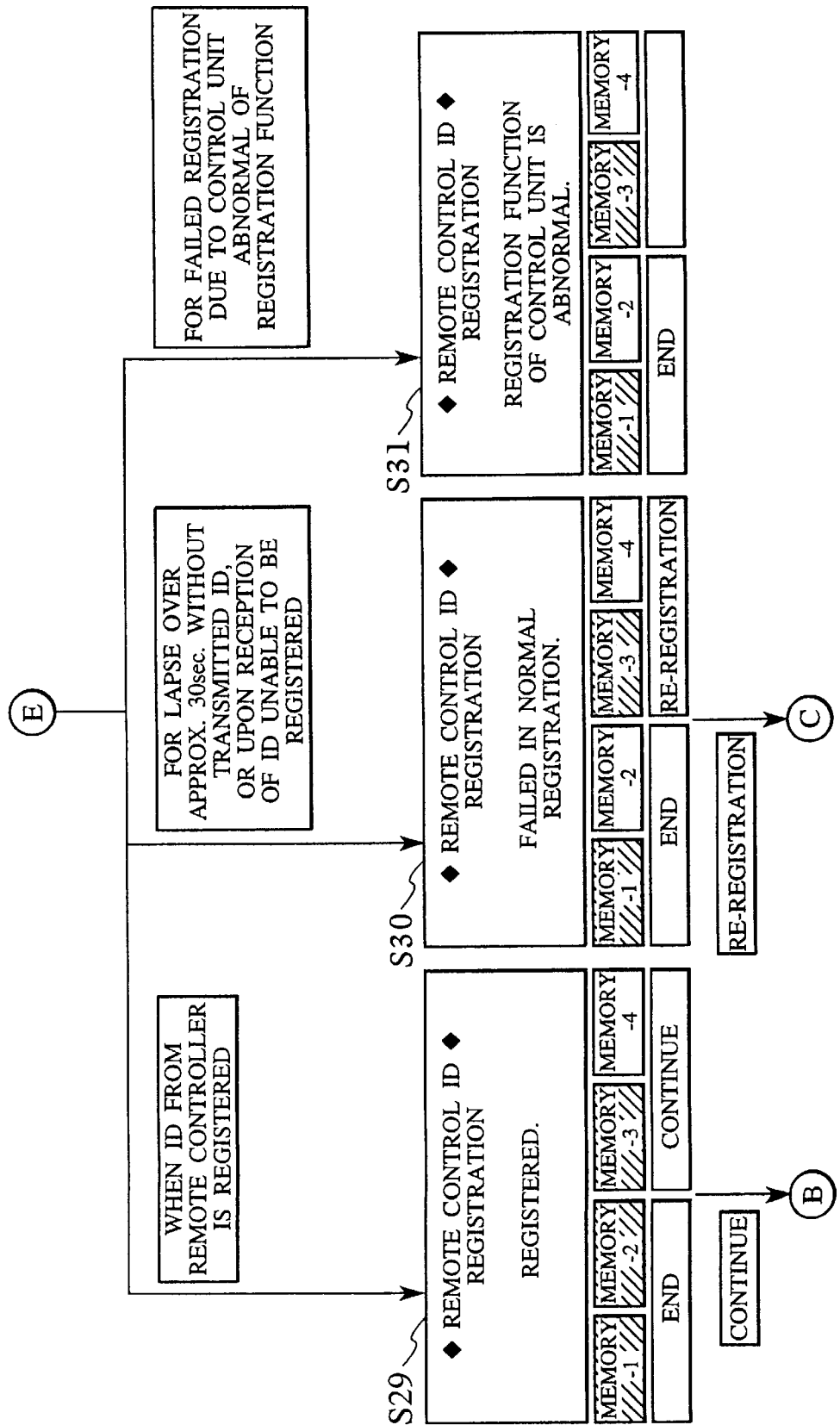
Figure 13:
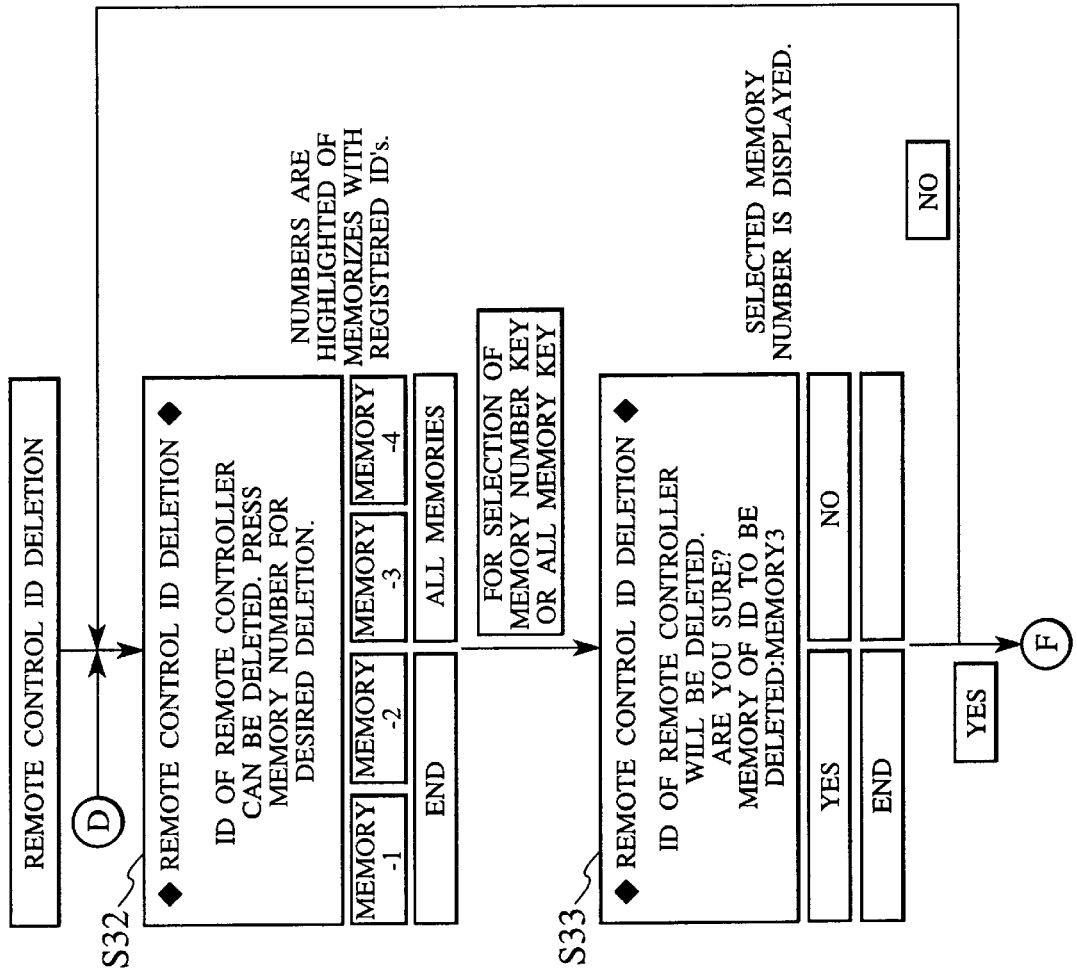

In a remote control ID setup/change selection screen of FIG. 9, if a "remote control ID memory check" mode is selected, a program flow goes to a step S21 shown in FIG. 10. The remote control ID memory check mode is for a check whether or not a transmitted ID from a remote controller 2 is registered. At a step S22, there is displayed a remote control ID check screen with a message instructing an operation of the remote controller 2. Upon this operation, an ID is transmitted from the remote controller 2 and is received at a vehicle-mounted controller 3, where it is collated with registered ID's, as they are read from a memory 46. When the received ID matches a registered ID, i.e., if a matching ID is stored in an addressed memory location of the memory 46, then at a step S23 an address key that corresponds to an address of the memory location of the matching ID is highlighted. If a number of ID's read from a number of memory locations are matching with the received ID, i.e., if they are each respectively identical to the received ID, there are highlighted a corresponding number of address keys. Thereafter, the flow again goes to the step S3 of FIG. 9, displaying the remote control ID setup/change selection screen. If the received ID is not registered at any address at the step S22, the flow goes therefrom to a step S24 for displaying a message "non-registered".

The remote control ID setup/change selection screen of FIG. 9 further has a "remote control ID registration" mode. If this mode is selected, the flow goes to a step S25 shown in FIG. 11. The remote control ID registration mode is for processing a transmitted ID from the remote controller 2 to register it at a selective one of four memory addresses, so that it is stored in a corresponding addressed memory location of a storage region of the memory 46. At a step S26, there is displayed a remote control ID registration screen, which is highlighted at an address key of each memory address having a registered ID and which gives a message instructing an operation of an address key of any address for a desired ID registration. In exemplary illustration in FIG. 11, address keys of a memory-1 and a memory-3 are highlighted and have ID's registered at their addresses. When an address key of an unused memory location or of an address having no registered ID is operated, i.e., when a non-highlighted address key is pressed, the flow goes to a step S27. If the address key of any address that has a registered ID is operated, i.e., if any highlighted address key is pressed, the flow goes to a step S28.

In the case the address key having no ID registered at its memory address is selected, there is displayed at the step S27 a screen indicating the selected address or memory location number (e.g. "memory-2"), with an instruction message for operation of the remote controller 2. When a transmitted ID from the remote controller 2 is stored in a selected memory location, the flow goes (via a node E) to a step S29 shown in FIG. 12, where it gives a message of completion of ID registration, highlighting a respective address key that has an ID registered at its address. If a time interval exceeding 30 seconds has elapsed with no ID transmitted from the remote controller 2 or when a received ID is unsuccessfully registered or unable to be registered for a reason the ID is to be blamed, the flow goes to a step S30, where it indicates a registration error message. When the vehicle-mounted controller 3 has failed to achieve a successful ID registration for a reason it has the responsibility, such as for a functional error in registration, the flow goes to a step S31 to give a message warning an abnormal registration function as a probable cause.

If the address key operated at the step S26 has an ID registered at its address, the flow goes to the step S28, as described, and indicates a warning message of presence of a registered ID at the selected address, suggesting a deletion of the registered ID to be executed before a desired registration. If an "END" key is then operated, the flow again goes to the step 3 to display the remote control ID setup/ change selection screen. The ID registration in the second embodiment may be effected at the step S27 in an overwriting manner, without deletion of an existing ID, e.g., by omitting the step S28.

The remote control ID setup/change selection screen of FIG. 9 also has a key for a "remote control ID deletion" mode. When this key is operated, the flow goes to a step S32 shown in FIG. 13. The remote control ID deletion mode permits ID's registered at all memory addresses of the storage region of the memory 46 to be wholly deleted, as well as an ID registered at any memory address to be deleted. The step S32 displays a screen including an "all memory deletion" key and four address keys, with an instruction message for address key operation. The four address keys are each operative to select a memory address of a registered ID to be deleted. Each address key having a registered ID at a corresponding address is highlighted. The "all memory deletion" key is operative to delete whole ID's stored in all memory locations. Upon key operation to any of those keys, the flow goes to a subsequent step S33, where it indicates a message demanding an instruction for a decision as to whether or not the registered ID(s) at the selected (or all) address(es) should be deleted. If a "NO" key is then operated, the flow again goes to the step S32 to display a remote control ID deletion screen.

Figure 14:
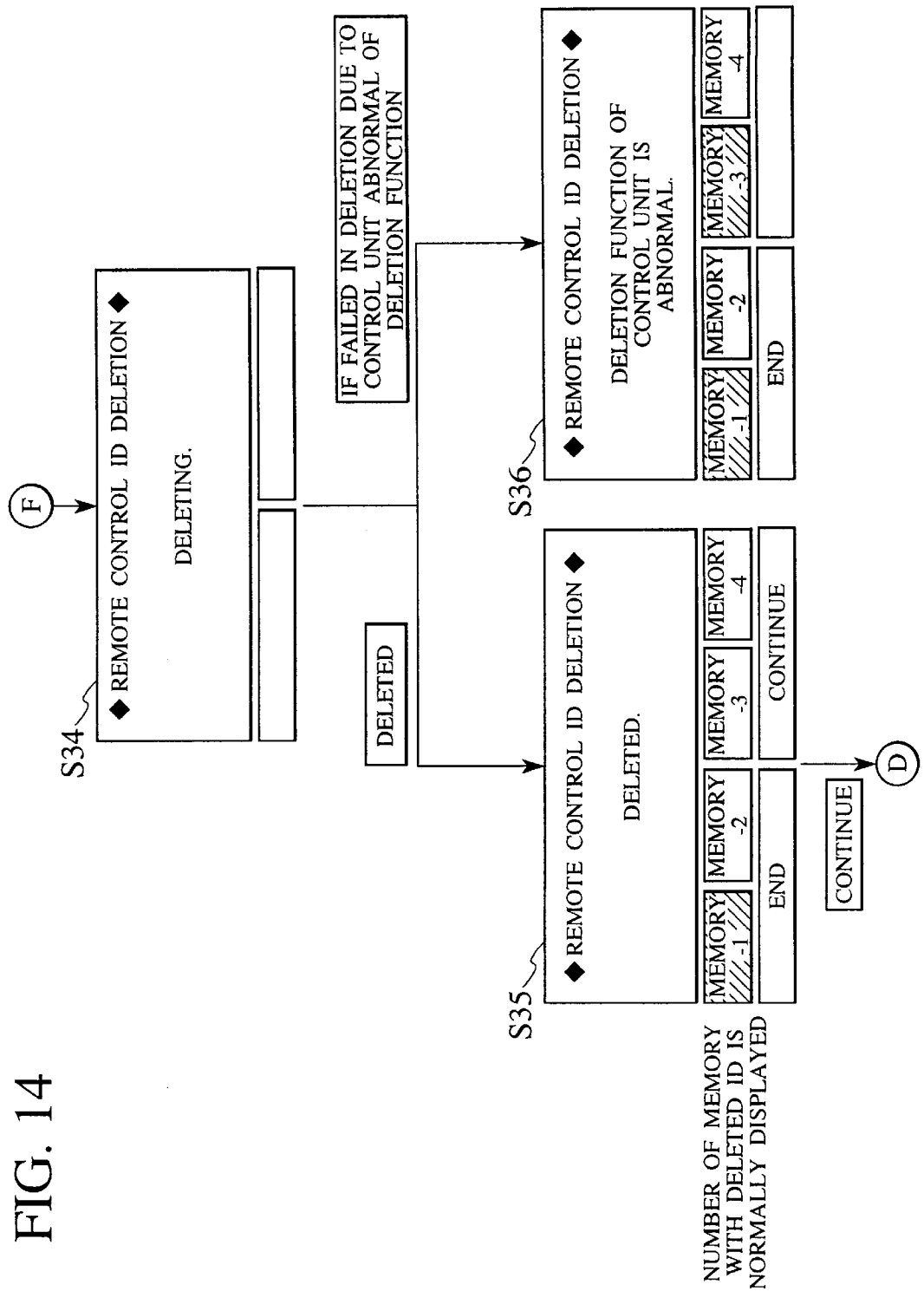

When a "YES" key is operated to consent to the decision for ID deletion at the step S33, the flow goes (via a node F) to a step S34 shown in FIG. 14, where it deletes (a) registered ID(s) at the selected (or all) address(es), displaying the ID(s) to be deleted. Upon completion of the ID deletion, the flow goes to a step S35 to display a screen with a message of complete deletion and four address keys. For any memory address where a registered ID has been deleted, a corresponding address key is not highlighted yet. When the vehicle-mounted controller 3 has failed to achieve a successful ID deletion at the step S34 for a reason it has the responsibility, such as for a functional error in deletion, the flow goes to a step S36 to give a message warning an abnormal deletion function as a probable cause.

In the embodiments described, key-less remote controller 2, the memory 46, the vehicle-mounted key-less entry controller 3 and the trouble diagnostic device 61 may individually comprise a remote controller as an ignition key, a memory of an incorporated disc or external connection type, a vehicle-mounted controller of a stationary or partially mobile arrangement, and an ID setup/change unit comprised of a data processor provided with a touch panel type display operative for entry of various data such as coded data.

Respective touch keys such as address keys displayed on an associated screen may be individually provided as operational key switches on a housing of the display.

While preferred embodiments of the present invention have been described using specific terms, such description is for illustrative purposes, and it is to be understood that changes and variations may be made without departing from the spirit or scope of the following claims.

What is claimed is:

1. A key-less entry system comprising:

a memory having a plurality of memory locations for individually storing a plurality of registered IDs;

a remote controller for transmitting an ID when an operation element is operated;

a vehicle-mounted controller for receiving the ID transmitted from the remote controller, collating the ID with a registered ID in any of the plurality of memory locations and responding to a match therebetween for executing a corresponding process to the operation element; and an ID setup and change unit operative for visual identification and manual selection of any of the plurality of memory locations and to prompt a user as to a manual operation of the ID setup and change unit for registration of the received ID in a manually selected one of the plurality of memory locations and for deletion of a registered ID from a manually selected one of the plurality of memory locations and responsive to said manual operation to select one of said registration and said deletion.

2. The key-less entry system according to claim 1, wherein the ID setup and change unit comprises a trouble diagnostic device separate from the vehicle-mounted controller and manually connectable thereto for executing trouble diagnoses of diverse vehicle-mounted control systems.

3. The key-less entry system according to claim 1, wherein the ID setup and change unit displays a matching condition between the received ID and a registered ID in a manually selected one of the plurality of memory locations.

4. The key-less entry system according to claim 1, wherein the ID setup and change unit displays an occupied condition of a manually selected one of the plurality of memory locations.

5. The key-less entry system according to claim 1, wherein the ID setup and change unit displays a vacant condition of a manually selected one of the plurality of memory locations.

6. A key-less entry system for vehicles, comprising:

a first controller operative at a remote distance from a vehicle to transmit a present ID;

a second controller fixed to the vehicle, the second controller having a plurality of memory locations for individually storing a plurality of registered IDs, the second controller receiving the ID transmitted from the first controller as an input ID, the second controller being operative for collating the input ID with a registered ID in any of the plurality of memory locations and responsive to a match therebetween to disarm key-less entry into the vehicle;

and a third controller selectively connectable to the second controller and operative for visual identification and manual selection of any of the plurality of memory locations and to indicate to prompt a user to select one of a first mode for registering the input ID in a manually selected one of the plurality of memory locations and a second mode for deleting a registered ID from a manually selected one of the plurality of memory locations.

7. The key-less entry system for vehicles according to claim 6, wherein the third controller is operative for indicating an occupied condition of the manually selected one of the plurality of memory locations.

8. The key-less entry system for vehicles according to claim 6, wherein the third controller prevents the input ID from being stored in an occupied one of the plurality of memory locations.

9. The key-less entry system for vehicles according to claim 6, wherein the third controller is operative in the second mode to effect selecting one of deleting a single registered ID and deleting all registered ID's by a single operation.

10. The key-less entry system for vehicles according to claim 6, wherein the third controller includes a touch panel display for displaying the plurality of memory locations as visually identifiable keys operative for said manual selection.

11. The key-less entry system for vehicle according to claim 6, wherein the third controller includes a touch panel display to prompt a user to select either one of the first and second modes.

12. The key-less entry system for vehicles according to claim 6, wherein the third controller is portable, and the second controller has a dedicated part for connection to the third controller.

13. The key-less entry system according to claim 6, wherein the third controller is further operative, response to the user's manual operation thereto, to perform diagnosis on an engine and an automatic transmission system.

14. A key-less entry system for vehicles in which an originated ID is authenticated relative to a registered ID to disarm key-less entry to a vehicle, the system comprising:

a plurality of registration locations to be individually occupied with an ID to be registered;

an ID originator for originating an ID;

an ID authenticator for receiving the originated ID and for authenticating the received ID relative to a registered ID; and a controller for controlling occupation of the plurality of registration locations to be visualized in an individually identifiable manner, the controller being responsive to a manual operation thereto for a random access to an arbitrary registration location to change an occupied state of the arbitrary registration location.

15. The key-less entry system for vehicles according to claim 14, wherein the controller is responsive to the manual operation to register the received ID in the arbitrary registration location.

16. The key-less entry system for vehicles according to claim 14, wherein the controller is responsive to the manual operation to delete a registered ID from the arbitrary registration location.

17. The key-less entry system for vehicles according to claim 14, wherein the controller includes a touch panel display for displaying the plurality of registration locations as visually identifiable keys each respectively operative by the manual operation.

18. A key-less entry system for vehicles in which an originated ID is authenticated relative to a registered ID to disarm key-less entry to a vehicle, the system comprising:

a plurality of registration locations to be individually occupied with an ID to be registered;

originating means for originating an ID;

receiving means for receiving the originated ID;

authenticating means for authenticating the received ID relative to a registered ID;

controlling means for controlling occupation of the plurality of registration locations to be visualized in an individually identifiable manner; and controlling means for responding to a manual operation thereto for a random access to an arbitrary registration location to change an occupied state of the arbitrary registration location.

19. A key-less entry system for vehicles, comprising:

a first controller fixed to a vehicle, the first controller being operative for collating an input ID input thereto with at least one registered ID therein, and responsive to a match therebetween for authorizing entry into the vehicle;

a second controller operative at a remote distance from the vehicle to transmit a preset ID to be received by the first controller as the input ID; and a third controller selectively connectable to the first controller and operative to prompt a user to select one of a first mode for registering the input ID in the first controller as another registered ID and a second mode for arbitrarily selecting at least one of all registered ID's in the first controller and deleting the selected at least one of all registered ID's, wherein the first controller has a plurality of memory locations each respectively storing one of all the registered ID's, the third controller is operative in the first mode to select an arbitrary one of the plurality of memory locations for storing the other registered ID, and the third controller prevents the input ID from being stored as the other registered ID in an occupied one of the plurality of memory locations.

20. A key-less entry system for vehicles, comprising:

a first controller fixed to a vehicle, the first controller being operative for collating an input ID input thereto with at least one registered ID therein, and responsive to a match therebetween for authorizing key-less entry into the vehicle;

a second controller operative at a remote distance from the vehicle to transmit a preset ID to be received by the first controlleras the input ID; and a third controller selectively connectable to the first controller and operative to prompt a user to select one of a first mode for registering the input ID in the first controller as another registered ID and a second mode for arbitrarily selecting at least one of all registered ID's in the first controller and deleting the selected at least one of all registered ID's, wherein the third controller comprises a data processor provided with a touch panel display operative for entering a data.

* * * * *